United States Patent
Rees

[11] 3,723,040
[45] Mar. 27, 1973

[54] INJECTION-MOLDING MACHINE WITH TRANSVERSE FEED

[75] Inventor: Herbert Rees, Toronto, Ontario, Canada

[73] Assignee: Husky Manufacturing & Tool Works Limited, Toronto, Ontario, Canada

[22] Filed: Jan. 17, 1972

[21] Appl. No.: 218,625

Related U.S. Application Data

[62] Division of Ser. No. 16,442, March 4, 1970, Pat. No. 3,659,997.

[52] U.S. Cl.................................425/245, 425/247
[51] Int. Cl..........................................B29f 1/03
[58] Field of Search......425/145, 146, 244, 245, 250, 425/247, 338, 234

[56] References Cited

UNITED STATES PATENTS

| | | |
|---|---|---|
| 3,535,742 | 10/1970 | Marcus...........................425/245 X |
| 3,491,408 | 1/1970 | Natkins...........................425/244 |
| 3,097,396 | 7/1963 | Ludwig...........................425/245 |
| 3,010,156 | 11/1961 | Smith...........................425/146 |
| 2,345,917 | 4/1944 | Coffman...........................425/146 |

FOREIGN PATENTS OR APPLICATIONS

| | | |
|---|---|---|
| 36/8323 | 6/1965 | Japan |
| 1,110,303 | 4/1968 | Great Britain |

*Primary Examiner*—J. Spencer Overholser
*Assistant Examiner*—David S. Safran
*Attorney*—Karl F. Ross

[57] ABSTRACT

An injection-molding machine with a set of stacked mold plates, defining several axially spaced mold cavities therebetween, includes an injection unit with one or more nozzles movable perpendicularly to the stack for contact with respective inlets, leading to the several cavities, which are aligned with these nozzles in the closed position of the multiple mold. The mold plates may be interconnected by a lazytong linkage or by lost-motion couplings for proper relative spacing in the open mold position.

4 Claims, 7 Drawing Figures

PATENTED MAR 27 1973

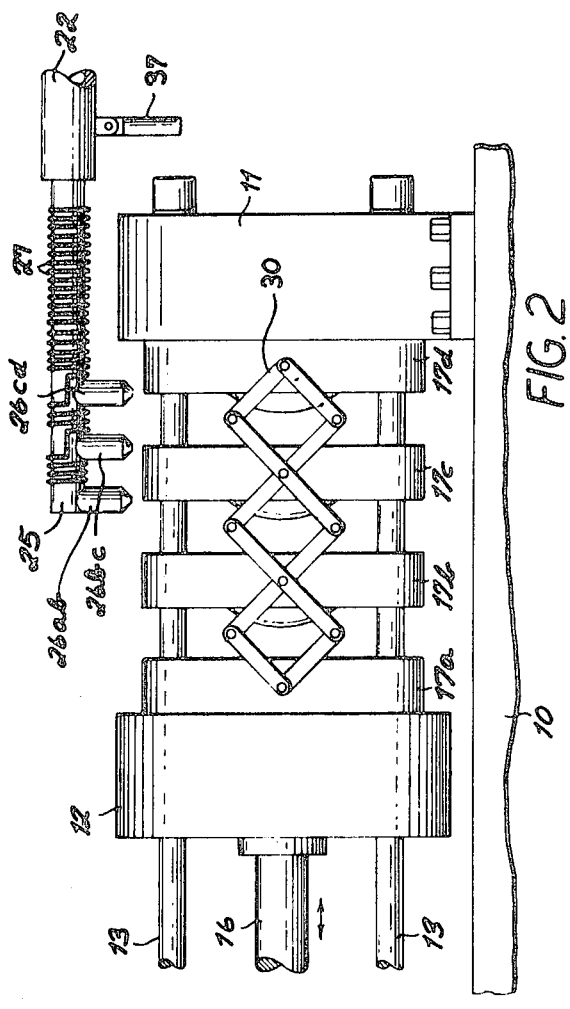
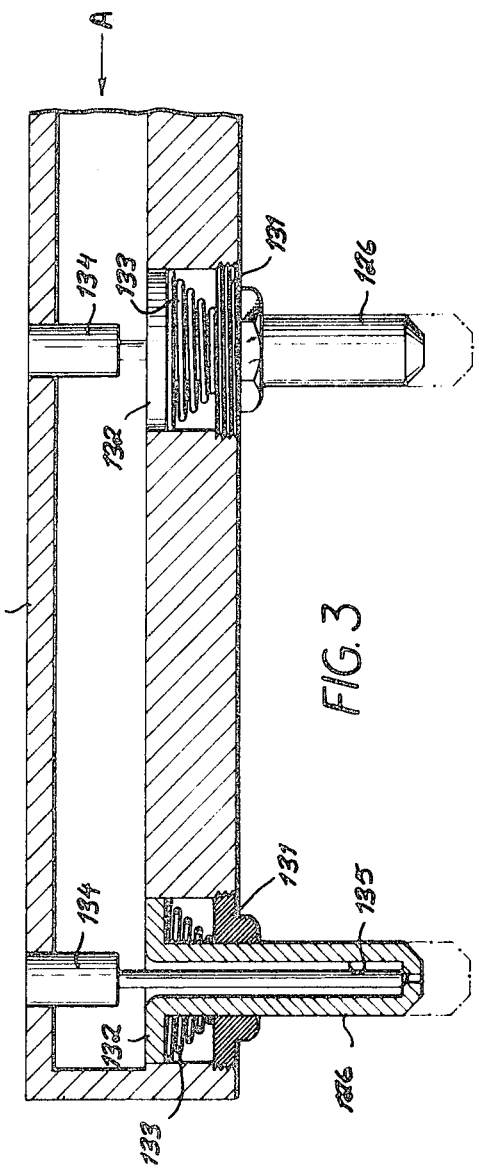

INJECTION-MOLDING MACHINE WITH TRANSVERSE FEED

This is a division of application Ser. No. 16,442, filed 4 March 1970, now U.S. Pat. No. 3,659,997.

My present invention relates to an injection-molding machine operating with either "hot" or "cold" runners, i.e., with inlets to their mold cavities which either are heated to retain a fluid residue of the injected plastic mass between mold cycles or are exposed in the open-mold position to release the hardened residue.

The conventional way of injecting hardenable plastic material into a mold cavity, with either type of runner system, is through one of the two relatively movable platens between which the mold plates are compressed in the closed-mold position, the injection path leading from a nozzle orifice in the outlet of an injection chamber through a sprue bushing in the adjacent (generally stationary) platen to a bore in the mold plate carried on that platen which may directly terminate at a mold cavity or from which several runner-forming branch paths extend to a cluster of cavities surrounding the bore. Even when these branch paths are exposed during the opening of the mold, i.e., when the machine operates with cold runners, the sprue bushing in the platen must always be kept hot enough to maintain the fluidity of the mass in that passage.

If several identical, complementary or even dissimilar articles are to be molded in one cycle, and if the required cavities are of such size or shape that they cannot be readily accommodated on the face of a single plate without undue increase in plate area and therefore in the requisite clamping pressure, two or more pairs or coacting plate surfaces must be provided at axially spaced locations on a stack of three or more relatively movable mold plates. The feeding of plastic mass to the more remote cavities, as seen from the injection unit behind the stationary platen, creates, however, considerable difficulties in view of the relatively long path along which the mass must be kept hot. Another problem is the prevention of "drooling", i.e., the suppression of leakage of hot plastic mass from the axially aligned feeder passages of the plates in the open-mold position.

It is, therefore, the general object of my present invention to provide an improved feeding system adapted to be used with either a single plate pair or a multiplicity of stacked mold plates, regardless of their number, for introducing a hardenable plastic mass into their cavities over paths of minimum length which can be easily heated for hot-runner operation and which reduce the amount of scrap in the case of cold-runner operation.

Another object is to provide a feeding system of this type whose injection path does not include either of the two relatively movable platens, thereby affording greater flexibility in the positioning of these platens to accommodate stacks of different height.

The term "stack", as used herein, denotes an assembly of generally coextensive mold plates which are relatively movable along an axis perpendicular to their major surfaces (whether this axis be horizontal, vertical or inclined) and which form two or more axially spaced mold cavities at these major surfaces, the articles molded in the cavities being removable therefrom upon axial separation of the plates.

In accordance with this invention, the inlet to each cavity terminates at an edge of at least one of the two plates defining that cavity, the associated injection unit including one or more nozzles which confront the plate edges on the side of the inlet or inlets and are alignable therewith in the closed-mold position; upon such closure, the nozzle or nozzles are displaced toward the plate edges for operative engagement with the associated inlets, being thereafter withdrawn to facilitate separation of the mold plates for discharging the molded article or articles.

A single inlet, formed as a bore in a middle plate sandwiched between two outer plates, may serve a pair of axially spaced mold cavities defined by the two faces of the middle plate and the confronting faces of the outer plates. With three or more axially spaced mold cavities, however, a plurality of inlets must be provided. In such a case the nozzles are advantageously carried on an axially extending heated manifold alongside the stack of plates, being movable toward and away from the stack either with the manifold or relatively thereto. Thus, the positioning means serving to bring the nozzles into operative engagement with the associated inlets (in synchronized relationship with the drive means serving for the opening and closure of the mold) may include hydraulic or pneumatic pistons, solenoids or the like acting directly on the manifold or its support; in an advantageous modification, each nozzle may be movably mounted on a seat within the manifold from which it is normally lifted by spring force and toward which it is urged during the injection phase by the pressure of the oncoming mass whereby its projecting part is extended to meet the confronting inlet at the stack edge. The same principle may, of course, be applied to a single nozzle seated in a heated conduit other than the manifold, such as the end of an injection chamber housing a plasticizing screw or a reciprocating piston.

Since, as a rule, the retraction of the nozzles from the stack need only to allow for the unhindered axial motion of the mold plates upon separation thereof, a stroke of just a few millimeters will generally suffice for the transverse displacement of the nozzles.

Another feature of my invention relates to the separation of the stacked mold plates between shots to enable the discharge of the molded articles. In order to insure proper spacing of the cavity-forming surfaces of these plates in the open-mold position, I interconnect these plates by a linkage positively limiting the extent of the separation of adjacent plates whereby the total stroke of the movable platen is distributed in a predetermined manner over the several plate pairs. In this connection it is worth remembering that, owing to the off-axial positioning of the injection means independently of the platens, both platens could be reciprocated simultaneously for the opening and closure of the mold.

Although in horizontal machines it will frequently be convenient to position the nozzle or nozzles beside the stack, instances exist in which a feed from above with the aid of an overhanging nozzle support is to be preferred. With the inlet to each mold cavity lying at the zenith thereof, the mass fills up the cavity more evenly and allows for a drainage of the overlying manifold by gravity as an anti-drooling measure. Naturally, drooling may also be prevented by shut-off means at each nozzle, e.g., as disclosed in my prior U.S. Pat. No. 3,254,371.

The above and other features of my invention will become more fully apparent from the following detailed description, reference being made to the accompanying drawing in which:

FIG. 2 is a side-elevational view of the same part of the machine shown in open-mold position;

FIG. 3 is an enlarged sectional view of part of a manifold usable in the machine of FIGS. 1 and 2;

Figure 1:
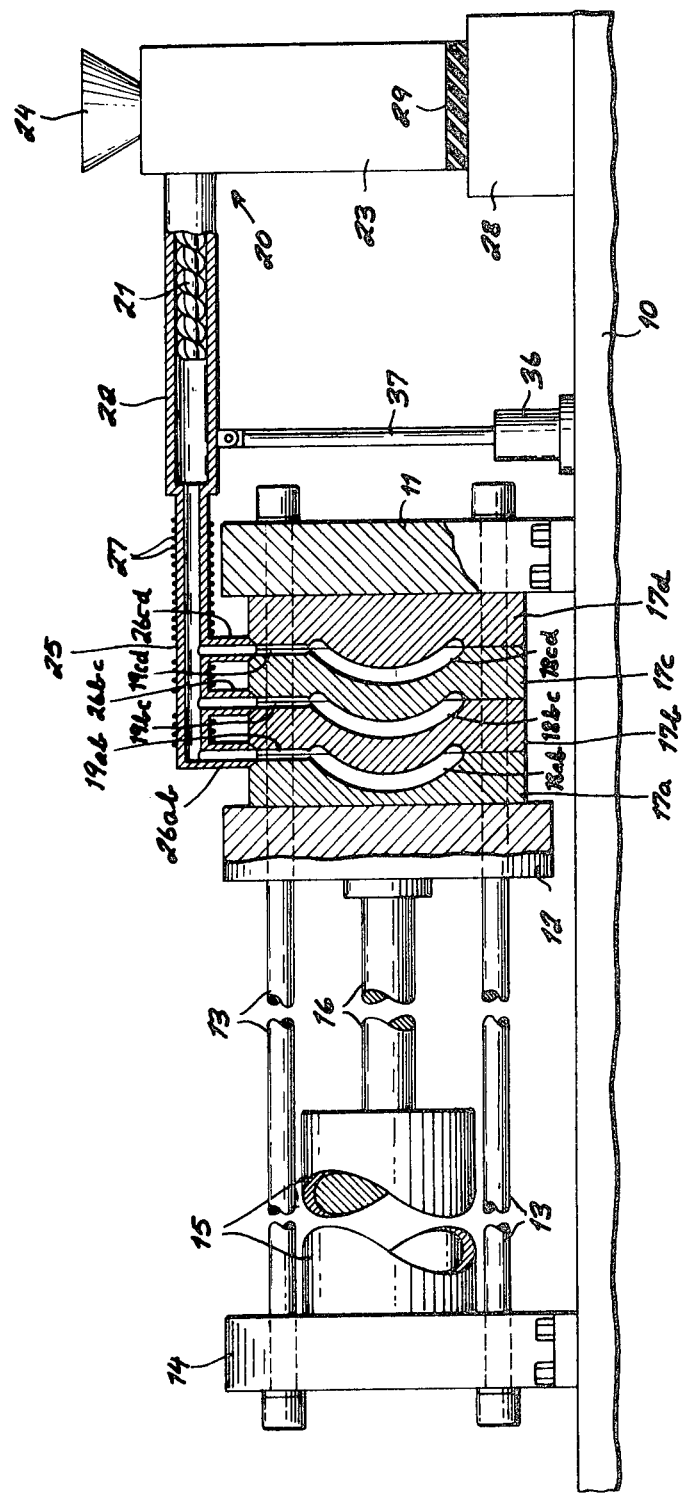
FIG. 1 is a side-elevational view, partly in section, of the mold and injection assemblies of a multiple-mold machine embodying my invention, shown in closed-mold position.

In FIGS. 1 and 2 I have shown the bed 10 of an injection-molding machine with a stationary platen 11 fixed to the bed, a movable platen 12 slidable above the bed on tie bars 13, and a block 14 similar to platen 11 secured to the bed 10 as a countersupport for the tie bars and a base for a ram cylinder 15 whose ram 16 is secured to platen 12 for reciprocating it with reference to platen 11. Between these platens, several mold plates 17a, 17b, 17c, 17d are slidably mounted on the tie bars 13 for compression therebetween upon closure of the multiple mold constituted by these plates; the confronting plate surfaces form three axially spaced mold cavities 18ab, 18bc and 18cd with inlets 19ab, 19bc and 19cd defined by complementary grooves terminating at the upper plate edges.

An injection unit 20 comprises a plasticizing screw 21 in a barrel 22 extending from a housing 23 which accommodates the screw drive and also has a hopper 24 for the introduction of granular thermoplastic material to be heated and plasticized by that unit in the conventional manner; screw 21 may be axially displaceable to act as an injection piston whose advance is synchronized with the operation of the mold drive 15, 16 to occur in the closed-mold position of FIG. 1. A manifold 25, forming an extension of barrel 22, horizontally overlies the stack 17a–17d and is provided with a set of axially spaced nozzles 26ab, 26bc and 26cd aligned in the closed-mold position with the inlets 19ab, 19bc and 19cd, respectively. Manifold 25 is provided with heating means, here illustrated as a wire coil 27, to maintain the plastic mass therein in a fluid state preparatorily to injection; similar heating means, not shown, maintain the barrel 22 at a suitable temperature. Injection housing 23 is shown to be resiliently mounted on a pedestal 28 by means of a pad 29 which allows the manifold 25 and its nozzles to be slightly raised and lowered with reference to the bed 10 whereby the nozzles can be brought into fluidtight engagement with the corresponding cavity inlets in the closure position of FIG. 1 and can be spaced therefrom the permit the separation of the mold plates as illustrated in FIG. 2. This separation is facilitated by a lazytong linkage 30 which is anchored to the two enter mold plates 17a, 17d mounted on platens 11, 12, and all the intervening mold plates to ensure their uniform spacing when the mobile platen 12 is retracted by the ram 16. Suitable ejectors, e.g., as described hereinafter with reference to FIG. 6, may be provided in at least some of these mold plates (e.g., plates 17b, 17c, 17d) in order to dislodge the molded articles from their cavity-forming surfaces when the mold is open.

In the system of FIGS. 1 and 2 the inlets 19ab e.t.c. are not heated so that cold runners are formed by the residual plastic mass therein; upon ejection of the molded articles, these runners break off at a constricted section of the inlet and may be separately dislodged from the mold.

As here specifically illustrated, the vertical reciprocation of manifold 25 is brought about by a hydraulic or pneumatic jack 36 on bed 10 having its piston rod 37 secured to the end of barrel 22.

FIG. 3 shows the end of a modified manifold 125 with a pair of nozzles 126 movably seated therein with the aid of threaded bushings 131, the nozzles having flanges 132 which are under pressure of biasing coil springs 133 tending to withdraw them into the manifold. This withdrawal is limited by internal pins 134 which plug or obstruct the nozzle bores 135 in the illustrated raised position of the nozzles, thereby preventing any drooling of the hot plastic mass from the conduit 125 when the nozzles are out of contact with the associated mold plates. The manifold 125, which may be heated electrically or by a circulating fluid (cf. FIG. 5), is here fixedly positioned at the outlet of a plasticizing chamber such as the screw barrel 22 (FIGS. 1 and 2) from which it periodically receives the plastic material as indicated by an arrow A. The pressure of this material upon the shoulders 132 forces the nozzles 126 outwardly and into engagement with the confronting mold inlets, simultaneously unblocking the nozzle bores 135 to permit injection to proceed; this extended nozzle position has been indicated in dot-dash lines.

Figure 4:
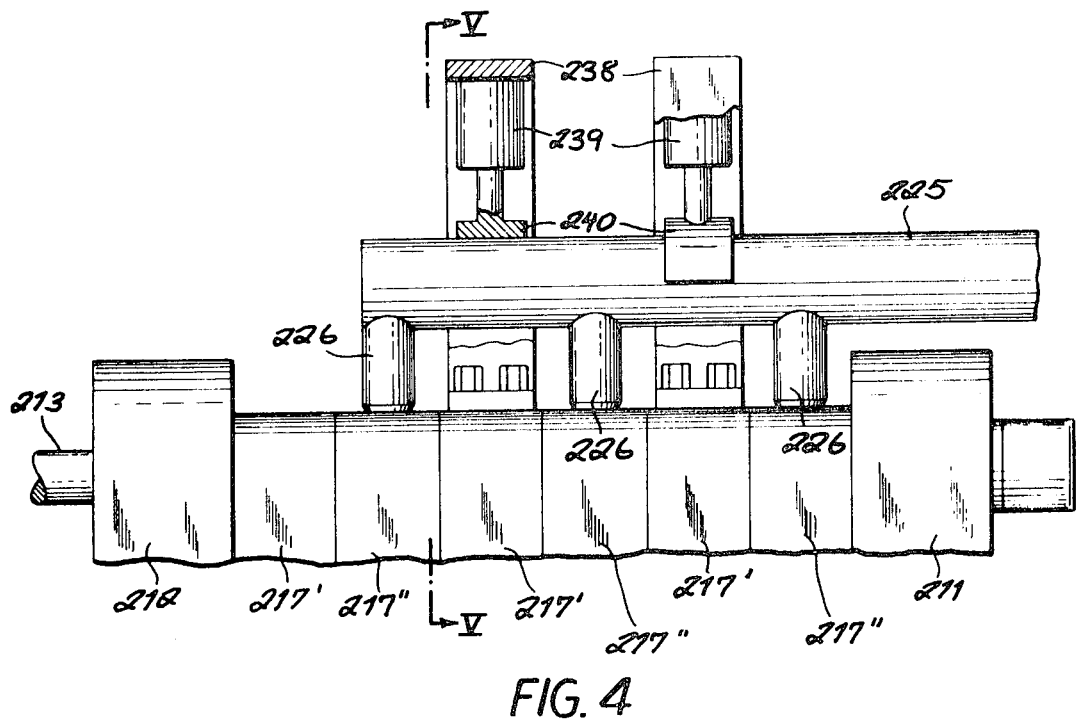
FIG. 4 is a fragmentary side-elevational view of a modified injection unit for a machine similar to that shown in FIGS. 1 and 2.
Figure 5:
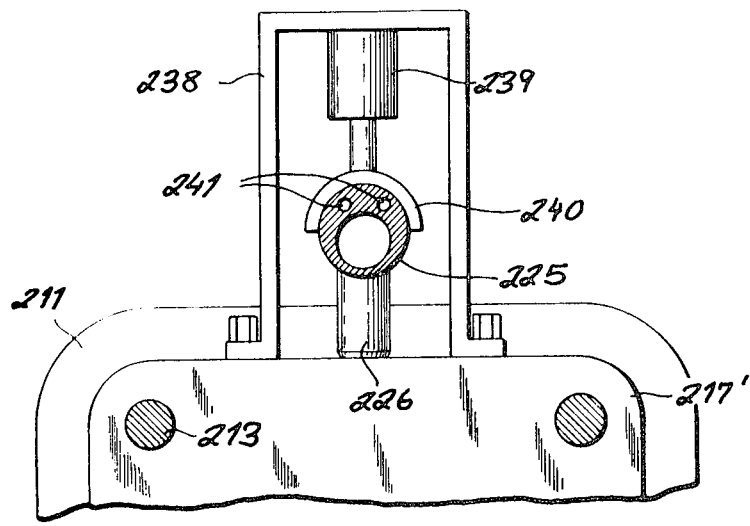
FIG. 5 is a cross-sectional view taken on the line V — V of FIG. 4.

FIGS. 4 and 5 show a manifold 225 with nozzles 226 co-operating with a stack of mold plates sandwiched between a pair of platens 211, 212, the mold plates being alternately designated 217' and 217''. The construction of these plates may be similar to that described hereinafter with reference to FIG. 7, only the intermediate plates 217'' being formed with inlets each feeding a pair of cavities at their surfaces confronting the adjoining plates 217'. Some of the plates 217' are shown to mount yokes 238 which straddle the manifold 225 and carry jacks 239 whose pistons terminate in shoes 240 which are normally spaced from the manifold but can be brought to bear upon the latter, as shown, whereby the nozzles 226 firmly contact the corresponding inlets of the confronting plates 217''. The manifold, of course, should again be flexibly mounted or otherwise displaceable to permit its limited reciprocation transverse to the yoke axis. Naturally, the operation of the hydraulic or pneumatic jacks 239 is again timed to coincide with the opening and closure of the mold as the plates 217', 217'' slide on tie rods 213; with the shoes 240 lifted off the manifold, this sliding is not impeded.

In FIG. 5 the manifold 225 is shown provided with channels 241 for the circulation of a heating fluid.

Figure 6:
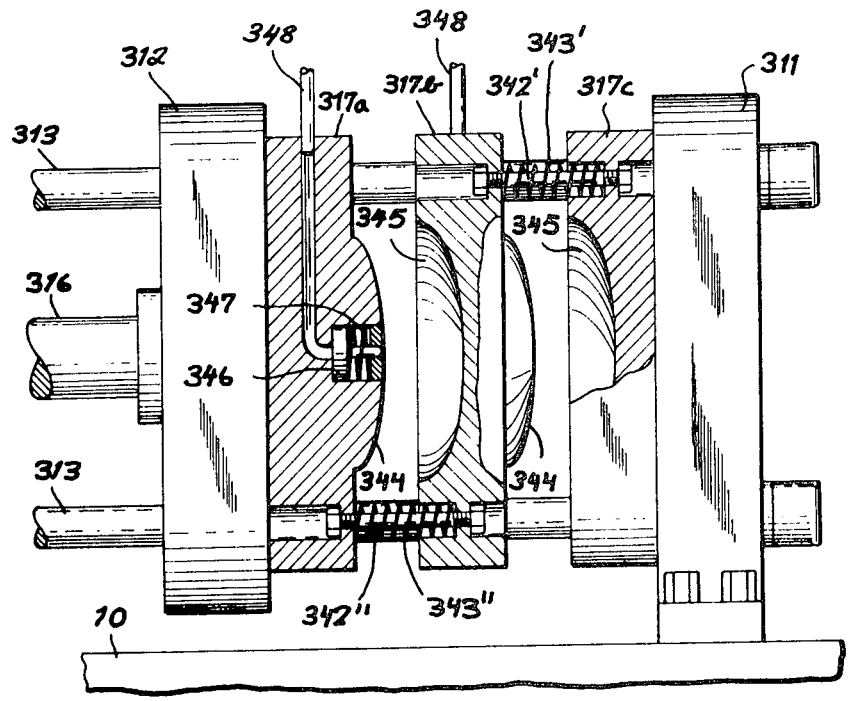
FIG. 6 is an elevational view, partly in section, of a modified mold assembly in open position.

In FIG. 6 I have shown a modified mold with plates 317a, 317b and 317c sliding on tie rods 313 which are secured to a fixed platen 311 and also support a movable platen 312 controlled by a ram 316. The two platens and the intervening plates are interconnected by a lost-motion coupling in the form of bolts 342', 342" surrounded by compression springs 343', 343"; the heads of the bolts and their associated nuts are recessed within the plates with enough mobility to allow unhindered closure of the mold against the force of springs 343' 343" when the ram 316 is extended (i.e., moves to the right). Upon retraction of the ram, the springs 343', 343" separate the mold plates and the platens to the extent permitted by the interconnecting bolts 342', 342", it being understood that these bolts may be distributed in any convenient manner about the peripheries of the plates.

In the mold assembly of FIG. 6, the right-hand surfaces of plates 317a and 317b are provided with male formations or cores 344 whereas the left-hand surfaces of plates 317b and 317c have corresponding female formations or recesses 345 forming respective cavities with these cores. The cavities communicate via inlets, not shown in FIG. 6, with an associated injection unit operating with either cold runners (as described above) or hot runners (as explained with reference to FIG. 7). Plates 317a and 317b are also provided with ejectors in the form of plungers 346 which can be displaced, against the force of leading springs 347, by hydraulic or pneumatic fluid admitted via flexible tubes 348 in synchronized relationship with the mold drive; such pressurization of the ejection plungers causes their tips to project from their cores 344, thereby dislodging the molded articles adhering to these cores.

Figure 7:
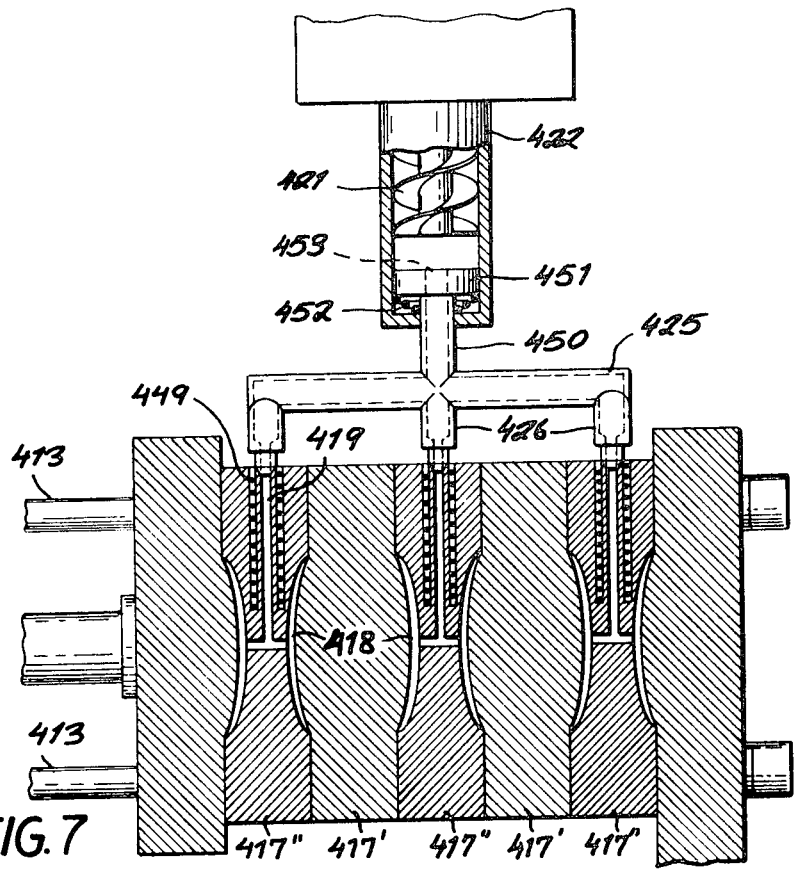
FIG. 7 is a top plan view of another modified mold assembly in closed position.

In FIG. 7 I show a mold assembly with alternate plates 417', 417", generally similar to those of FIGS. 4 and 5, mounted on tie bars 413; plates 417" have inlets 419 in the form of channeled portions surrounded by heaters 449 whereby hot runners are kept fluid in these inlets when the mold plates are separated. Each inlet 419 serves a pair of cavities 418 on opposite sides of the corresponding plate 417". These inlets are engageable by nozzles 426 on a heated manifold 425 having a central supply conduit 450 rigid with a piston head 451 inside a plasticizing cylinder 422 containing a rotatable and axially movable screw 421. A strong compression spring 452, bearing upon piston head 451, tends to withdraw the manifold 425 with its nozzles 426 from the stack of mold plates 417', 417"; when the screw 421 is advanced to create a pressure sufficient to overcome the force of spring 452, with concurrent unblocking of the feeding orifice 353 via a gate not shown, the manifold and its nozzles are moved into engagement with the stack to inject the liquefied plastic material into the cavities 418.

Naturally, the principles herein described are also applicable to stacks wherein each mold plate is formed with two or more cavities on the same surface, supplied from a common inlet or from different inlets co-operating with separate nozzles on the manifold. The lazytong coupling 30 (FIG. 2) is representative of a variety of parallelogrammatic linkages adapted to maintain uniform separation between a set of three of more mold plates. Furthermore, my invention encompasses combinations, not specifically disclosed, of compatible features from different embodiments.

I claim:

1. An injection-molding machine comprising a plurality of mold plates relatively movable between an open-mold and a closed-mold position along an axis perpendicular to their major surfaces, at least one of said mold plates being provided with inlet means leading from an edge thereof to a cavity formed therein, drive means for relatively moving said mold plates along said axis, a source of hardenable plastic mass under pressure, injection means offset from said axis including nozzle means alignable with said inlet means in said closed-mold position, said injection means including a heated conduit communicating intermittently with said source and forming an internal seat for said nozzle means, the latter being outwardly displaceable from said conduit under pressure of said mass against said seat in a direction generally transverse to said axis, positioning means synchronized with said drive means for aligning said nozzle means with said inlet means in said closed-mold position preparatorily to establishment of communication of said conduit means with said source for admitting a flow of said mass through said inlet means into said cavity, biasing means effective upon a cessation of said pressure to withdraw said nozzle means into said conduit from said inlet means prior to separation of said mold plates, and plug means in said injection means engageable with said nozzle means upon such withdrawal for blocking the further outflow of said mass therefrom.

2. A machine as defined in claim 1 wherein said mold plates form a horizontal stack, said conduit overhanging said stack.

3. A machine as defined in claim 1 wherein said nozzle means comprises a tube which is slidable in a wall of said conduit and has an outwardly projecting end provided with an orifice, said plug means comprising a pin spacedly surrounded by said tube and provided with a tip normally obstructing said orifice.

4. A machine as defined in claim 3 wherein said tube has a shoulder inwardly spaced from said wall, said biasing means comprising a compression spring interposed between said shoulder and said wall.

* * * * *